United States Patent [19]

Shimizu et al.

[11] Patent Number: 4,941,608
[45] Date of Patent: Jul. 17, 1990

[54] HOT WATER SUPPLYING SYSTEM

[75] Inventors: Tomoyuki Shimizu, Himeji; Yoshikazu Taniguchi, Yamasaki; Motohiro Higuchi, Ako; Masashi Suzuki, Tatsuno, all of Japan

[73] Assignee: Matsushita Electric Works, Ltd., Japan

[21] Appl. No.: 448,638

[22] Filed: Dec. 11, 1989

[30] Foreign Application Priority Data

Dec. 23, 1988 [JP] Japan .................. 63-326961
Dec. 23, 1988 [JP] Japan .................. 63-326962
Dec. 23, 1988 [JP] Japan .................. 63-326963
Dec. 23, 1988 [JP] Japan .................. 63-326964
Dec. 23, 1988 [JP] Japan .................. 63-326967

[51] Int. Cl.$^5$ ........................... G05D 23/12
[52] U.S. Cl. .......................... 236/12.12; 4/192
[58] Field of Search ............. 236/12.12, 78 D; 364/502; 4/192

[56] References Cited

U.S. PATENT DOCUMENTS

| | | | |
|---|---|---|---|
| 4,547,977 | 10/1985 | Tenedini | 236/12.12 X |
| 4,682,626 | 7/1987 | Bergmann | 137/551 |
| 4,682,628 | 7/1987 | Hill | 137/624.11 |
| 4,682,728 | 7/1987 | Oudenhoven | 236/12.12 |
| 4,741,363 | 5/1988 | Hu | 137/607 |
| 4,875,623 | 10/1989 | Garris | 236/78.0 X |

*Primary Examiner*—William E. Wayner
*Attorney, Agent, or Firm*—Stevens, Davis, Miller & Mosher

[57] ABSTRACT

A hot water supplying system is adapted to be connected to hot and cold water sources to mix the hot and cold water for discharging the mixed water. The system comprises a mixing chamber having a mixing valve movable therein to vary the mixing ratio of the hot water to the cold water, and a controller at which an intended water temperature is selected in accordance with a temperature scale provided thereat. The controller is operatively connected to the mixing valve so as to move the same into a proper position of discharging the water at the selected temperature. The mixing valve is given a temperature-responsive characteristic to be capable of self-adjusting its position independently of the controller in such a way as to adjust the water temperature in an open loop control manner at the start of discharging the water. An initial compensation mode is provided in the system to monitor the water temperature and determine a deviation between the monitored temperature and the selected temperature. When the deviation exceeds an acceptable level, the controller responds to reassign the temperature scale with the mixing valve position in order to reduce the deviation to the acceptable level and therefore to provide a consistent relation between the water temperature and the selected temperature, whereby compensating for variations in temperature and pressures of the hot and cold water sources available at differing installation sites.

9 Claims, 14 Drawing Sheets

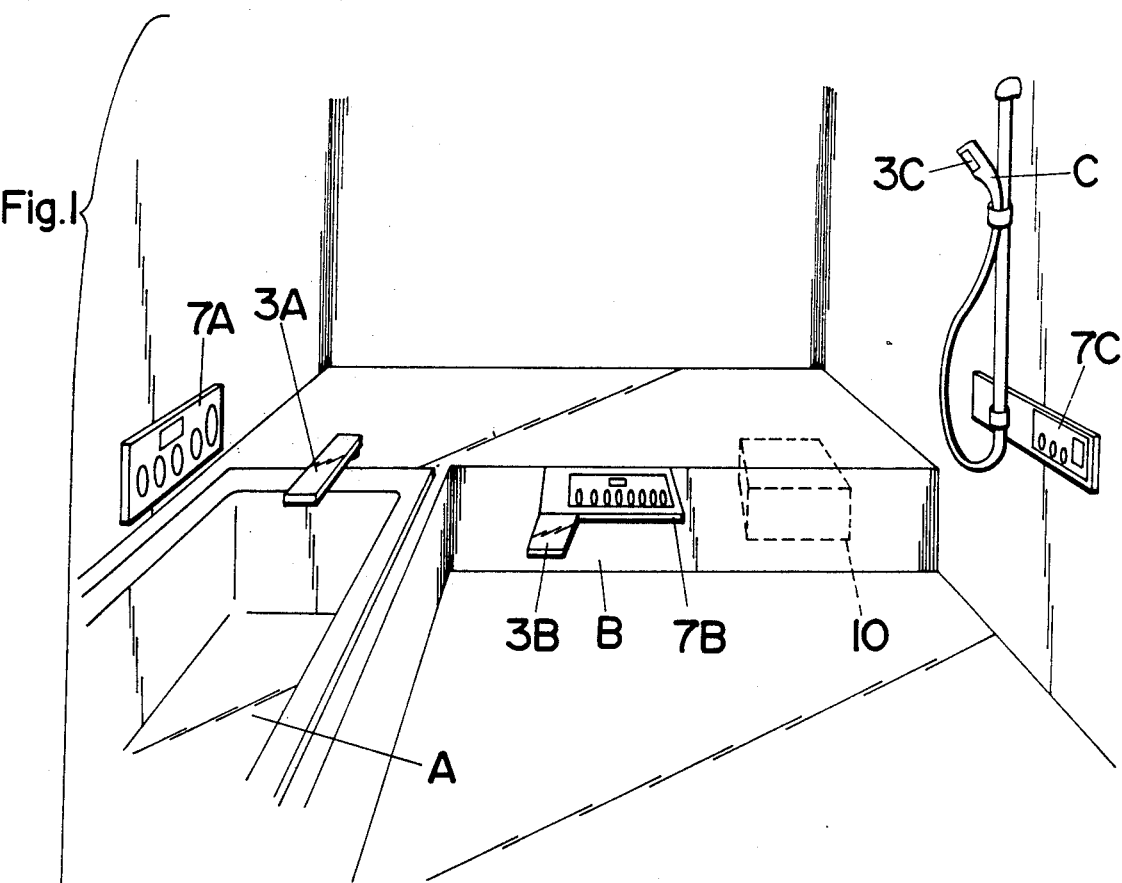
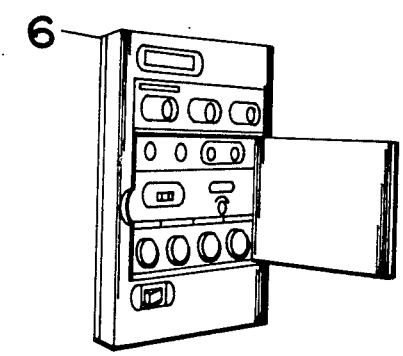
Fig.1

| SECTION | EXCIATION MODES | CLOCK RATE |
|---------|-----------------|------------|
| [A] | 4-division microstep [full-step] | 584 pps |
| [B] | 8-division microstep [half-step] | 584 pps |
| [C] | 4-division microstep [full-step] | 584 pps |
| [D] | 4-division microstep [full-step] | 584 pps |
| [E] | 8-division microstep [half-step] | 584 pps |
| [F] | 4-division microstep [full-step] | 584 pps |

HOT WATER SUPPLYING SYSTEM

BACKGROUND OF THE INVENTION

1. Field of the Invention

The present invention is directed to a hot water supplying system for supplying hot water to bathroom faucets such as for bathtubs, basins, and showers.

2. Description of the Prior art

There have been provided in the art a hot water supply system which mixes water flowing from hot and cold water sources to discharge through an outlet the mixed water at a desired temperature. The system utilizes a mixing valve movable within a mixing chamber in fluid communication respectively with the hot and cold water sources. The mixing valve is operably connected to a handle or controller to be driven thereby to move into a suitable position within the mixing chamber in order to mix the hot and cold water at a suitable proportion for supplying the water at a temperature selected at the handle or the controller. The mixing valve is preferably of temperature-responsive type to effect self-adjusting the temperature of the water being discharged in an open loop control manner. Such open loop control is essential and advantageous rather than a feed back control for the purpose of operating the system in a fail-safe manner at the start of discharging the hot water in that it can certainly prevent the discharge of the water having a temperature higher than intended that may cause scalding. In other words, if the feed back control is utilized to control the water temperature at the start of discharging the hot water while monitoring the temperature of the water being discharged, there is no hot water being discharged so that the system would monitor the temperature of the remaining water in the mixing chamber which temperature is sometimes considerably low as it may has been cooled after the previous hot water supplying. Consequently, the system would respond in a feed back manner to rush the hot water of high temperature in excess proportion in an attempt to compensate for such low temperature. However, the result is that an excess amount of the hot water at a temperature higher than intended would be discharged, which is not expected by the user and is very dangerous to the user. Therefore, the feed back control should be avoided at the start of discharging the hot water for avoiding scalding or other hazard resulting from unexpectedly high temperature water, although it is effective for temperature control while the hot water is constantly discharged.

In view of the above, the open loop control is preferred at each start of discharging the hot water to make the system fail-safe. In fact, the open loop control has been accepted also because of its simple structure and of less cost requirement. As described in the above, the prior hot water supply system of open loop temperature control type generally utilizes the mixing valve of self-adjusting capability in response to the temperature of the water being discharged. Such mixing valve incorporates, for example, so called a thermo wax having high thermal dilative properties by which the valve position is self-adjusted independently of the handle and the controller. Although the open loop temperature control using the mixing valve of self-adjusting type is generally acceptable, it may cause a problem that the temperature of the hot water being discharged is deviated or shifted critically from the temperature selected by the user depending upon a particular installation site. The inconsistency between the actual temperature of the water and the temperature intended by the user comes from the fact that the temperature and pressure of the hot water as well as the cold water fed to the system from the individual sources may vary with different installation sites. To compensate for such varying conditions associated with the particular installation site, the prior art system is required at its initial installation to adjust the position of the mixing valve mechanically by the use of a special jig or tools. However, such adjustment is generally made by a skilled person well understanding the mechanical structure of the system and is inconvenient particularly for a person not knowing the structure of the system.

SUMMARY OF THE INVENTION

The above problem has been eliminated in the present invention which provides an improved hot water supplying system which is capable of easily compensating for varying conditions seen at differing installation sites to exactly match the temperature of the hot water being discharged with the temperature selected by the user. The hot water supplying system in accordance with the present invention comprises a mixing chamber with hot and cold water inlets adapted to be coupled respectively to hot and cold water sources and with an outlet for discharging the mixed water. A mixing valve is operatively connected to an electric motor to be thereby driven to move within the mixing chamber to vary the mixing ratio of the volume of the hot water to the cold water fed through the respective inlets. The system also includes a controller having an input section to set or select a temperature of the water intended to be discharged from the mixing chamber through the outlet. The controller operates to control the motor, in accordance with a predetermined relation between a temperature scale determined at the controller and the position of the mixing valve within the mixing chamber, to move the mixing valve into a suitable position in order to discharge the water at the temperature selected at the input section. The mixing valve comprises a temperature-responsive actuator which adjusts the position of the mixing valve independently of the controller in response to the temperature of the water being discharged for self-adjustment of the water temperature to the temperature selected at the controller. Also included in the system is an initial temperature compensation means which can be activated in the initial installation of the system to compensate for possible variations in the temperature and pressure of the hot and cold water sources available at the particular installation site. The initial temperature compensation means comprises a temperature sensor for sensing the temperature of the water being discharged from the mixing chamber; a motor driver to drive the motor to move the mixing chamber to a reference position within the mixing chamber; a deviation detector which detects a deviation between the temperature of the water being discharged with the mixing valve at the reference position and the temperature designated at the controller as corresponding to the reference position of the mixing valve. Thus determined deviation is processed so as to obtain an offset value which corresponds to the shifting amount of the mixing valve required to maintain the deviation within an acceptable level, which offset value is stored in a memory. Based upon the offset value, the compensation means reestablishes the relation between the temperature scale at the controller and the position of the mixing valve within the mixing chamber in order to exactly associate the temperature to be selected at the controller with the position of the mixing valve for discharging the water at a temperature as close as possible to the temperature selected at the controller. Once the above initial compensation is completed to store the offset value in the memory, the system can control the shifting amount of the mixing valve using the offset value in exact association with the temperature selected by the user, thereby assuring to discharge the water at a desired temperature without requiring the above initialization at each operation.

Accordingly, it is a primary object of the present invention to provide a hot water supplying system which is capable of easily compensating for variations in temperature and pressure available at differing installation sites and therefore capable of being successfully adjusted to the particular installation sites, yet controlling the temperature of the water by means of the self-adjusting mixing valve in an open loop control at the start of discharging the water to prevent unaccidental discharge of the water at a temperature higher than expected by the user.

The controller includes a variable resistor with a handle by the manipulation of which the above offset value is determined and stored thereat as an electric resistance. Also included in the controller is a display with a guide indicator which is arranged adjacent the handle of the variable resistor and indicates the manipulating directions of the handle in determining the offset value. With the help of the guide indicator, the user can easily perform the initialization of determining a suitable offset value which compensates for the specific variations seen at the installation site.

It is therefore another object of the present invention to provide a hot water supplying system in which the initializing operation can be easily made with reference to the guide indicator indicating the manipulating direction of the handle for determination of the offset value.

A mode selection switch is provided in the system to selectively operate the system in a normal operation mode for controlling the water temperature by shifting the position of the mixing valve based upon the monitored water temperature and in the initial compensation mode for effecting the above initializing operation.

After the system starts supplying the water in the normal operation mode to constantly discharging the water, convenient controls of the temperature can be effected in a feed back manner by monitoring the temperature of the water being discharged. As one scheme for effecting such feed back control, the controller incorporates a driver circuit which is designed to drive the motor or the mixing valve faster when the difference between the monitored water temperature and the temperature selected at the controller is greater than a predetermined value than when the temperature difference is less than the predetermined value. Consequently, the system assure a fine adjustment of the water temperature when the temperature to be intended to change is not so far from the previously selected temperature, preventing over- or under-shooting condition of discharging the water at excessively high or low temperature. On the other hand when the intended temperature is far from the previously selected temperature, the system can rapidly respond to change the water temperature without causing a substantial delay.

It is therefore a further object of the present invention to provide a hot water supplying system which is capable of changing the temperature of the water selectively at fast and slow rates in a convenient manner.

Another convenient control of the water temperature is a delayed temperature change which is made when the difference between the monitored water temperature and the selected temperature is detected to exceed a critical value. To this end, the controller includes means for controlling the mixing valve to move in the direction of reducing the temperature difference in a delayed fashion or delayed time-interval when the temperature difference exceeds the critical value. This feature is responsible alone or in corporation with the above slow temperature adjusting to well prevent the unacceptable over- or under-shooting, which is therefore a still further object of the present invention.

Further, the controller includes moderation means which acts to retain the water being discharged at a temperature lower than the selected temperature by a suitable extent within a limited time period after the start of supplying the water, insuring against high temperature water discharging at the very beginning of the water discharging, which would otherwise irritate the skin of the user or may cause scalding. This is particularly useful and comfortable when the user takes a shower, which is therefore a further object of the present invention.

The motor, which is driven to shift the position of the mixing value for control of the water temperature, is preferably a stepping motor of which speed is adjusted by changing excitation modes thereof so that the temperature control can be made selectively in rapid and slow modes depending upon the difference between the monitored water temperature and the selected temperature. To drive the stepping motor reliably in accordance with the control output from the controller, the system utilizes a position sensor providing a reference signal upon detection of that the mixing valve is in the reference position and controls the stepping motor to move the mixing valve until the reference signal is detected each time the water supplying is finished. Thus, the mixing valve can be moved back exactly into the reference position at the end of the water supplying even when there occurs a noise or other cause which may drive the stepping motor erroneously, such that the temperature control in the next operation is made by shifting the mixing valve from the reference position. By defining the reference position as corresponding to a temperature frequently selected or mid point of the temperature range available at the controller, the temperature control can be made with a minimum shifting amount of the mixing valve and with less chance of suffering from the noise, whereby insuring rapid and reliable temperature control.

It is therefore a further object of the present invention to provide a hot water supplying system which is capable of effecting rapid and reliable temperature control.

These and still other objects and advantages will become more apparent from the following description of the preferred embodiment when taken in conjunction with the accompanying drawings.

BRIEF DESCRIPTION OF THE DRAWINGS

FIG. 1 is a schematic view illustrating a bathroom to which a hot water supplying system of the present invention is adapted and a master controller utilized in the system;

DETAILED DESCRIPTION OF THE PREFERRED EMBODIMENT

Figure 2:
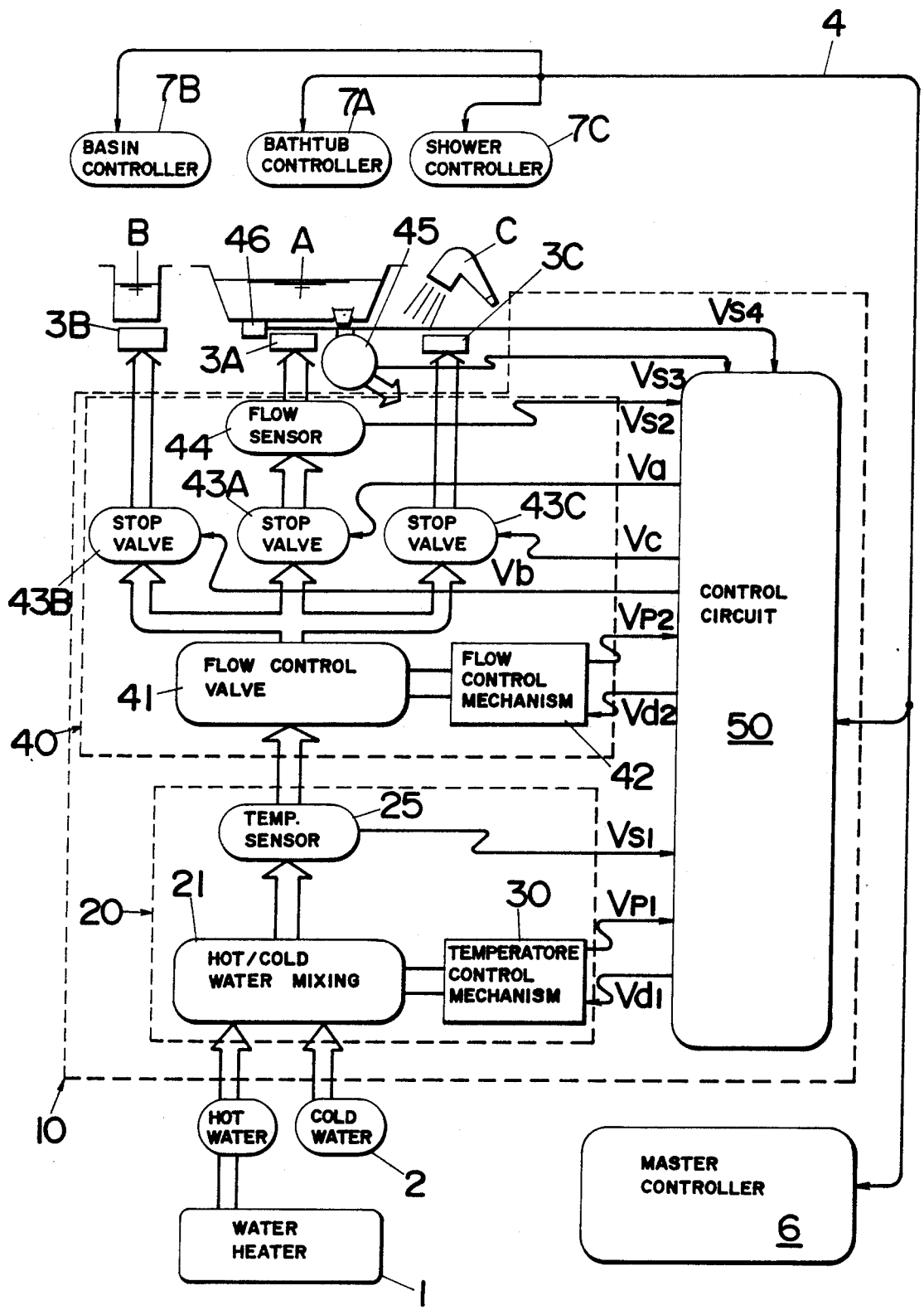
FIG. 2 is a block diagram of the hot water supplying system in accordance with a preferred embodiment of the present invention.
Figure 3:
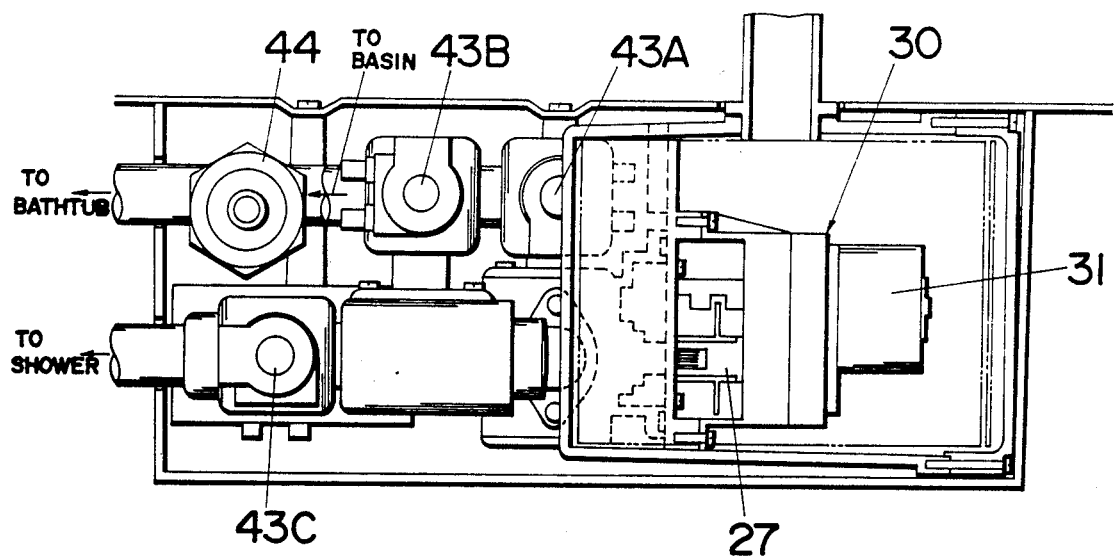
FIG. 3 is a plan view of a main unit of the above system.
Figure 4:
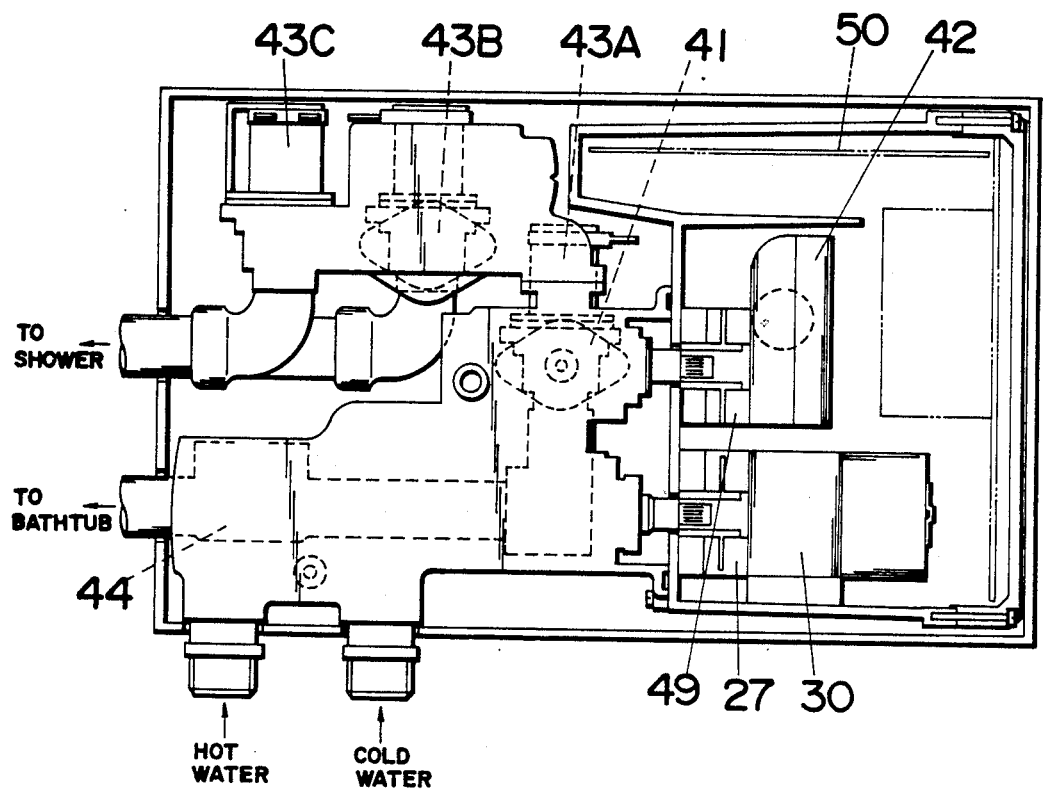
FIG. 4 is a side view of the above unit.
Figure 5:
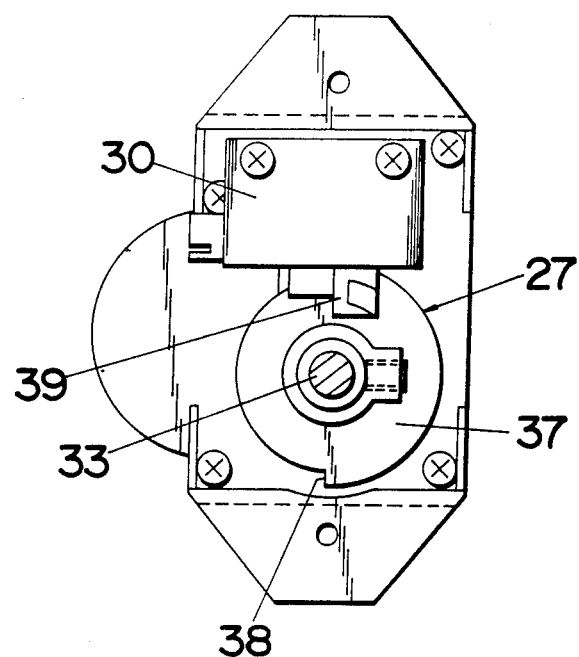
FIG. 5 is a front view of the above unit.
Figure 6:
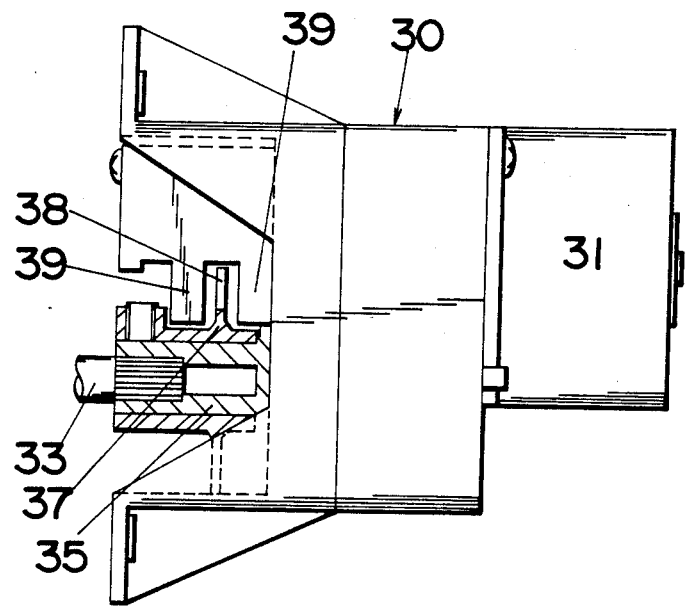
FIG. 6 is a side view of a portion of the above unit.

FIG. 1 shows a bathroom provided with faucets 3A,3B, and 3C for a bathtub [A], a basin [B], and a shower [C] to which a heating system of the present invention is adapted. As shown in FIG. 2, the system comprises a main unit 10 adapted to be coupled to hot water source 1 (i.e., water heater), a cold water source 2, and to the faucets 3A, 3B, and 3C through a flow control section 40. The main unit 10, which may be located adjacent the bathroom, has a mixing section 20 with a mixing chamber 21 for mixing hot and cold water from the hot and cold water sources 1 and 2 to obtain the water at a desired temperature. The mixed water is fed through the flow control section 40 and finally discharged selectively through the faucets 3A, 3B, and 3C. The main unit 10 is connected via control line 4 respectively to a master controller 6 located remotely from the bathroom and individual terminal controllers 7A, 7B, and 7C located adjacent the bathtub [A], basin [B], and shower [C] so that the user can set various instructions at one of the controllers for control of the system with reference to information displayed at the individual controllers. The data and instruction are transmitted through the line 4 in a time-division multiplexing manner between the controllers 6, 7A to 7C and the main unit 10.

Figure 7:
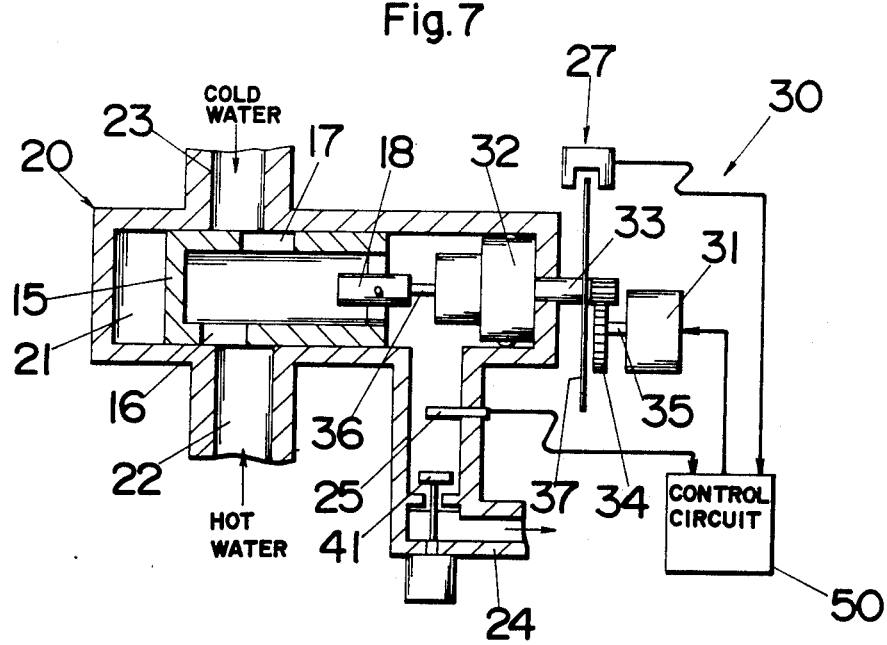
FIG. 7 is a schematic view of a mixing chamber with a mixing valve driven by an electric motor incorporated in the above unit.

As shown in FIG. 7, the mixing chamber 21 is formed with inlets 22 and 23 adapted to be coupled respectively to the hot and cold sources 1 and 2 and with an outlet 24 adapted to be coupled to the faucets 3A, 3B, and 3C through the flow control section 40. The chamber 21 has a mixing valve 15 in the form of a hollow cylinder which is closed at one end and open at the other end. The valve 15 has a pair of ports 16 and 17 which are diametrically opposed and longitudinally staggered to one another to be in fluid communication respectively with the hot and cold water inlets 22 and 23. The valve 15 is operably connected to a temperature control mechanism 30 which includes a stepping motor 31 to move the valve 15 in an axial direction to vary the opening amounts of the ports 16 and 17 for proportioning the hot and cold water, whereby discharging the water at a temperature which is a function of the valve position within the chamber 21. The mechanism 30 includes a rotary-to-reciprocation converter 32 which has a rotary shaft 33 extending outwardly of the chamber 21 to be engaged through gearing 34 to a motor output shaft 35 and has an plunger 36 which is connected to the valve 15 within the chamber 21 so as to axially move the valve 15 The motor 31 is controlled by a control circuit 50 in the main unit 10 to vary the position to the valve 15 in accordance with an intended temperature selected by the user at one of the master controller 6 and the corresponding terminal controller 7A, 7B, or 7c.

The valve 15 is formed at the connection to the plunger 36 with a temperature responsive actuator 18 in the form of a sealed casing containing a thermo-wax into which the end of the plunger 36 is immersed. The thermo-wax has high thermal dilative property to expand and contract upon being heated and cooled such that the actuator 18 can move together with the valve 15 relative to the plunger 36 within a limited extent in response to the environment temperature. In this manner, the valve 15 can self-adjust its position independently of the stepping motor 31 or the control from the controllers for effecting automatic temperature control of the water in an open loop manner, i.e., without relying upon a feed back control. Such open loop control is essential and important at the start of discharging the water in preventing hot water hazard as discussed previously in association with the problems of the prior art and is incorporated in the present system to override, at the start of discharging the water, the feed back control which is also utilized in the system to effect versatile and delicate temperature controls of the water being constantly discharged.

Figure 8:
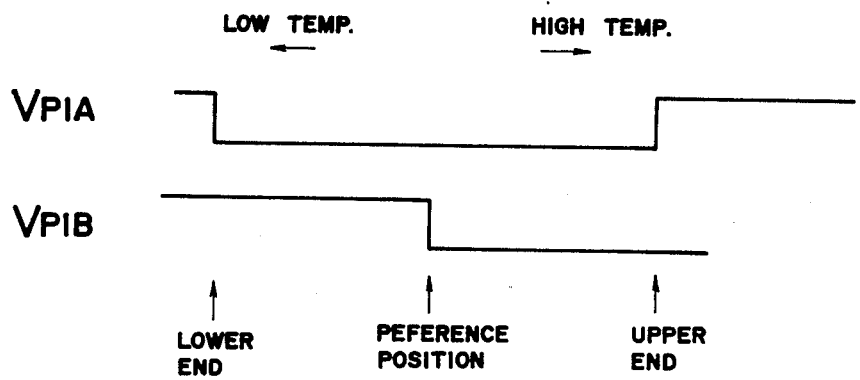
FIG. 8 is a waveform chart of signal transmitted from a position sensor for the mixing valve.

For the feed back control, the system includes a temperature sensor 25 monitoring the temperature of the water being discharged through the outlet 24 and transmitting a sensor signal Vs1 indicative of the monitored temperature to the control circuit 50. The mechanism 30 receives a drive signal Vd1 from the control circuit 50 to drive the motor 31 and also transmits to the control circuit 50 a position signal Vp1 indicative of the position of the valve 15. The position signal Vp1 is issued from a position sensor 27 which comprises, as shown in FIG. 7, a disk 37 fitted around the motor output shaft 35 and a pair of photo-interpreters 39. The motor output shaft 35 is in the form of a sleeve receiving a serrated portion of the rotary shaft 33 of the gearing 34 for coupling therebetween so that the disk 37 is rotatable together with the rotary shaft 33 and therefore in synchronism with the valve 15. The disk 37 is formed with circumferentially spaced notches 38 so that the photo-interrupters 39 examine the angular displacement of the notches 38 or the shafts 33 and 35 in order to detect the position of the valve 15 within the mixing chamber 21. The valve positions to be detected are those corresponding to the upper and lower ends of the temperature range available and an intermediate position which is defined in the present system as a reference position. In response to the detection of the valve position, the mechanism 30 transmits back to the controller circuit 50 the position signal Vp1 which comprises signals Vp1A and Vp1B, as shown in FIG. 8.

Turning back to FIG. 2, the flow control section 40 comprises a flow control valve 41, a flow control mechanism 42 incorporating a DC motor driving the flow control valve 41 to vary the flow rate of the water in accordance with an instruction from the controller circuit 50, and stop valves 43A, 43B, and 43C associated respectively with the faucets 3A, 3B, and 3C. A flow sensor 44 is also provided between the stop valve 43A and the faucet 3A to monitor the volume of the water having been supplied to the bathtub [A]. Another flow sensor 45 and a level sensor 46 are provided respectively to monitor the volume of the water discharged from the bathtub and monitor the level of the water within the bathtub. The operations of the flow control section 40 is also controlled by the control circuit 50. In the figure, Va, Vb, and Vc are control signals from the control circuit 50 to open and close the corresponding stop valves 43A, 43B and 43c; Vs2 to Vs4 are sensor output signals transmitted from the respective sensors 44, 45, and 46 to the control circuit 50; Vd2 is a drive signal to drive the DC motor in the mechanism 42; and Vp2 is a signal indicative of the condition of the DC motor fed to the control circuit 50.

Figure 9:
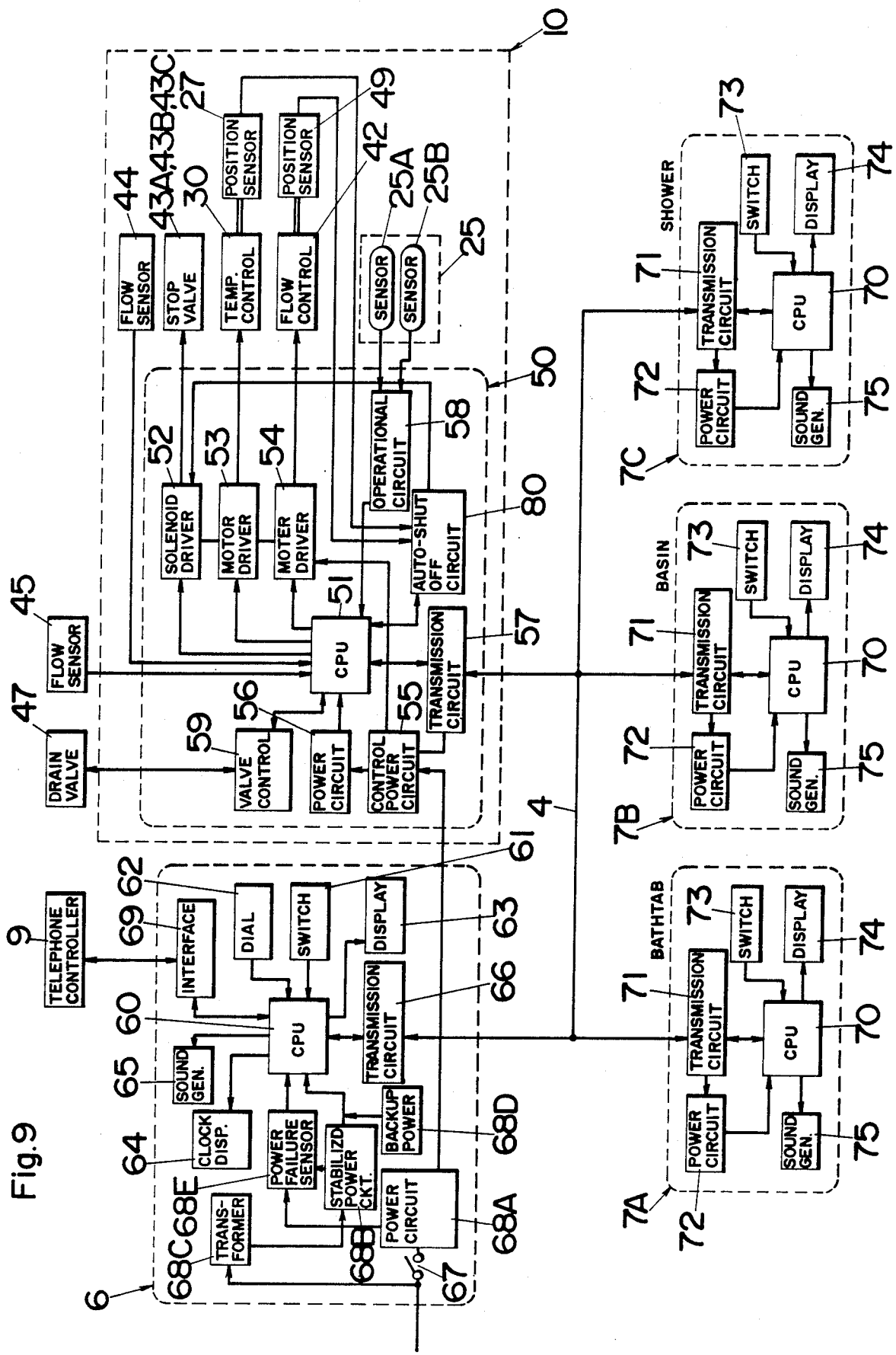
FIG. 9 is a circuit block diagram of the above unit.

FIG. 9 shows a block diagram of the master controller 6, the individual terminal controllers 7A, 7B, and 7C, and the control circuit 50. The master controller 6 comprises a CPU 60 responsible for setting, displaying, and transmission of various data, a switch 61 for selection of the operational modes of the system, a set dial 62 for changing various settings of the system, a display 63 for indication of the settings and the conditions of the system, and a clock display 64 incorporating a timer. A transmission circuit 66 is provided to interact with CPU 60 for transmitting and receiving the data in the time-division multiplexing manner to and from the control circuit 50 as well as the terminal controllers 7A, 7B, and 7C. The master controller 6 also includes a power switch 67 for energizing the whole system, a power circuit 68A providing a system voltage (+24 V), an additional stabilized power circuit 68B rectifying and smoothing an input ac voltage supplied through a transformer 68C to provide a circuit voltage (+5 V) to CPU 60, an auxiliary power circuit 68D with a backup battery for supplying voltage to CPU 60 at the time of a power failure detected by a power failure sensor 68E. Further included in the master controller 6 are a sound generator 65 for issuing confirmation sounds at the setting and warning sounds upon occurrence of a failure, and an interface 69 for coupling with a telephone controller 9 by which the system is connected to telephone line to be remotely controlled.

Each of the terminal controller 7A, 7B, and 7C has the same configuration comprising a CPU 70 responsible for data display and transmission, a transmission circuit 71 for transmitting and receiving the signal through line 4, a power circuit 72 providing a circuit voltage (+5 V) by processing the signal transmitted through the line 4, an operation switch 73 for setting the temperature of the water to be discharged as well as the water flow rate, a display 74 for indication of the water temperature, the conditions of the system, and abnormal operation modes of system, and a sound generator 75 issuing sounds at the time of manipulating the operation switch 73 as well as a warning sound upon detection of an abnormal condition.

The control circuit 50 comprises a CPU 51 for data transmission, water temperature control, water flow control, system failure detection, and system failure display. For this purpose, the circuit 50 includes a driver 52 for actuating solenoids respectively for the stop valves 43A, 43B, and 43C, a driver 53 for the stepping motor 31, and a driver 54 for the DC motor in the flow control mechanism 42. Each driver is energized by a control voltage (+24 V) supplied from a control power circuit 55, while CPU 51 is supplied with a circuit voltage (+5 V) obtained at a stabilized power circuit 56. Also included in the circuit 50 are a transmission circuit 57 to transmit and receive the time-division multiplex signal through the line 4, an operational circuit 58 to check a variation between the temperatures of the water sensed respectively by thermistors 25A and 25B as well as a deviation between the temperature of the water being discharged and the temperature selected by the user, a drain control circuit 59 for actuating the drain valve 47 of the bathtub, and an auto shut-off circuit 80 which detects malfunction of CPU 11 by means of a watch-dog timer and actuates the solenoid driver 52 for shut of the stop valves 43A, 43B, and 43C upon detection of such malfunction. In FIG. 9, a position sensor 49 is shown to detect the operating position of the DC motor output shaft of the mechanism 42 as the function of the opening amount of the flow control valve 41 in the like relation between the position sensor 27 and the temperature control mechanism 30.

In the present system, CPU 51 is designed to control the mechanism 30 such that, during a limited time period after the start of discharging the water, the water temperature is maintained at a temperature lower than the selected temperature by, for example, −6° C. in due consideration of a over-shooting which may be possible with the feed back control of the system, whereby preventing the water at a temperature higher than expected from discharging through the faucets 7A, 7B, or 7C. Also, the stepping motor 31 is controlled by CPU 51 to vary its speed depending upon the difference between the temperature of the water being discharged and the selected temperature. When the temperature of the water being discharged comes around the selected temperature, the stepping motor 31 is driven by a half-step mode (i.e., an 8-division micro step driving in the embodiment) to rotate at a slow speed, and is otherwise driven by a full-step mode (i.e, a 4-division micro-step driving) to rotate at a high speed. In this manner, the motor speed is changed in dependance upon the difference between the temperature of the water being discharged and the intended temperature, to thereby prevent the over-shooting or the under-shooting of the temperature while insuring a rapid adjustment of the water temperature. Further, CPU 51 is configured to operate the mechanism 30 in such a manner as to, each time the water discharging is finished, move the mixing valve 15 until the position sensor 27 transmits the reference position signal which is indicative of that the valve 15 is actually in the reference position, i.e, the position corresponding to the mid point between the upper and lower ends of the temperature range available in the present system. Whereby the valve 15 can be held exactly in the reference position even if there is a noise or other cause which would drive the motor 31 to an unexpected extent, and is ready to adjust its position for mixing the water at a temperature desired at the next operation of discharging the water. By defining the reference position as corresponding to the mid point of the temperature range, it is expected to maintain the shifting amount of the valve position at a minimum and thereby insure a rapid and reliable adjustment of the water temperature. It is noted at this time that the operational circuit 5s determines whether or not the difference between the water temperature sensed by the sensor 25 and the selected temperature exceeds a predetermined critical value and transmits the information of the temperature difference to CPU 51, which in turn, controls the motor 31 in a delayed fashion to reduce the temperature difference when it is determined to exceed the critical value.

Figure 10:
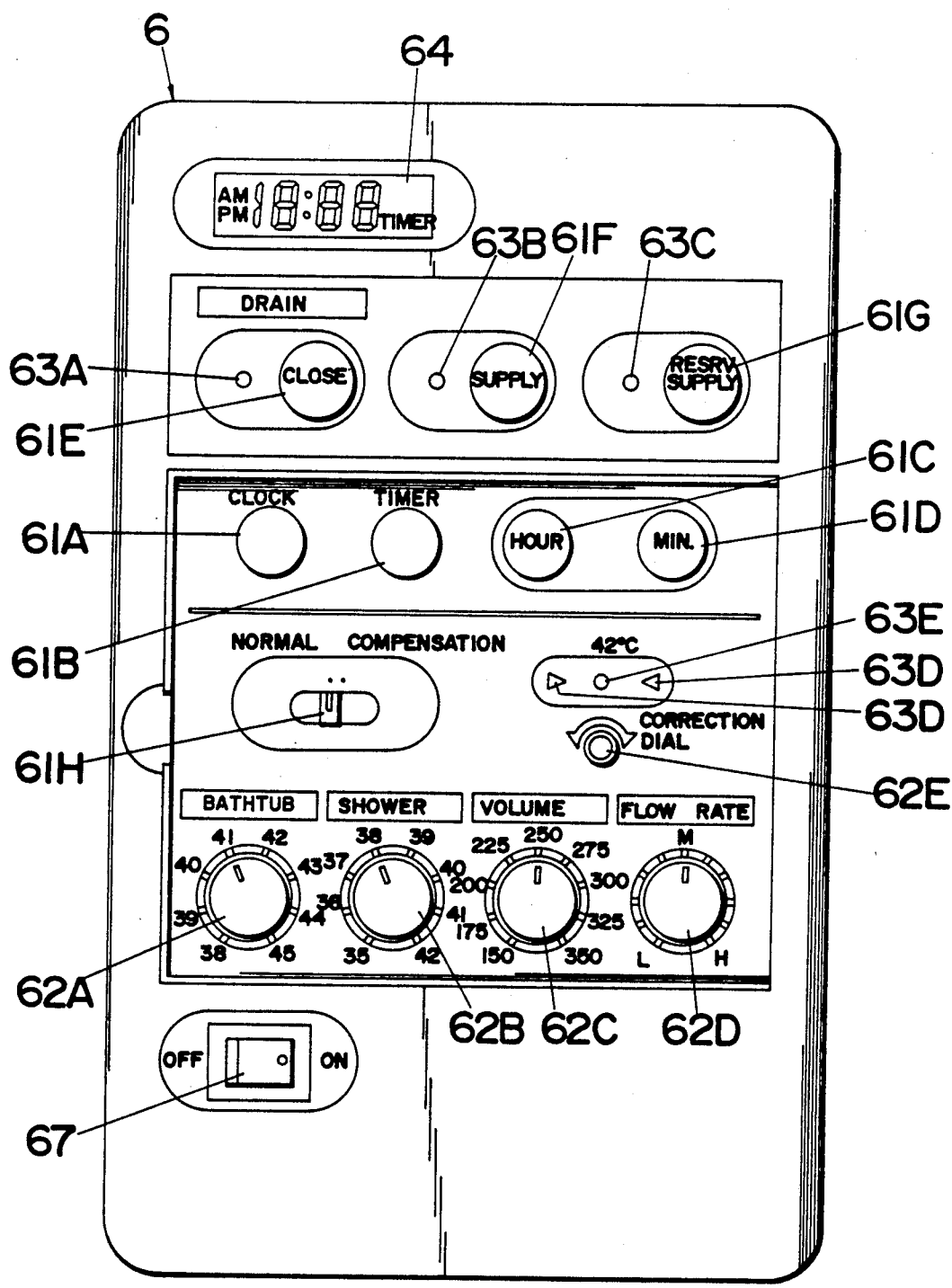
FIG. 10 is a front view of a control panel of the master controller.

As seen in FIG. 10 illustrating a front panel of the master controller 6, the switch 61 includes clock control switches 61A to 61D for present time and timer settings, valve control switch 61E for opening and closing of the drain valve 47, a water supply control switch 61F for supplying a fixed volume of the water through the bathtub faucet 3A, a reservation switch 61G for scheduled filling of the bathtub with the water at a desired time, and a mode selection switch 61H for selection between a normal operation mode and an initial compensation mode.

The dial 62 is also shown to comprise a dial 62A to set a standard temperature of the water to be discharged through the bathtub and basin faucets 3A and 3B within a temperature range of 38° to 45° C. in an increment of 1° C., a dial 62B to set a standard temperature of the water to be discharged through the shower faucet 3C within a temperature range of 35° to 42° C. in an increment of 1° C., a dial 62C to set a standard volume to be filled in the bathtub within a range of 150 to 350 litters in an increment of 10 litters, a dial 62D to set a standard flow rate, and a correction dial 62E for corrections of the standard temperatures of the water defined by the dials 62A and 62B in view of possible variations in temperature and pressure of the hot and cold water sources available in installation sites and also variations in the operational characteristics of the mixing section 20. A standard temperature of the water discharged through the basin faucet 3B is selected to be equal to that of the water discharged through the shower faucet 3C. It should be noted at this time that the correction dial 62E is manipulated at the initial compensation mode to adjust the system to a particular installation site. In this mode, the mixing valve 15 is held at the reference position so as to determine a deviation between the temperature predetermined as corresponding to the reference position of the valve and the temperature of the water being actually discharged. The correction dial 62E is operatively connected to a variable resistor which stores an offset value corresponding to the shifting amount of the valve 15 or the angular displacement of the motor 31 required to maintain thus detected temperature deviation below an acceptable level. Therefore, by manipulating the dial 62E to obtain the proper offset value, the system can be initialized to compensate for the deviation and reassociate the temperature scale of the system with the temperature of the water actually detected based upon the offset value stored in the resistor, thereby insured to produce the water at a temperature substantially equal to the selected temperature in the normal operation mode.

Further, the display 63 of the controller 6 includes a LED (light emitting diode) 63A for indication of the condition of the drain valve 47 [LED is on when the drain valve 47 is closed and repeats flushing when the valve 47 is open], a LED 63B for indication of the water supplying mode [LED is on when normal water supply is selected, repeats flushing at 1 Hz when timer controlled water supply is selected, and repeat flushing at 2 Hz when the water supply is scheduled through a telephone line], a LED 63C for indication of the reservation status [LED is on when the reserved water supply is set and turn off when the reservation is cancelled], and LEDs 63D and 63E which are located adjacent the correction dial 62E to provide indications by the help of which the user can perform the initial compensation of the system [center LED 63E is on when the dial 62 is adjusted to a correct position and the other two LEDs 63D with arrowed configuration are on until the correction dial 62E is rotated to the correct position for indication of the directions in which the dial has to be rotated]. The clock display 64 is provided in the form of a LCD segment display which, upon occurrence of system failures, can display error codes denoting particular events of the failures.

Figure 11:
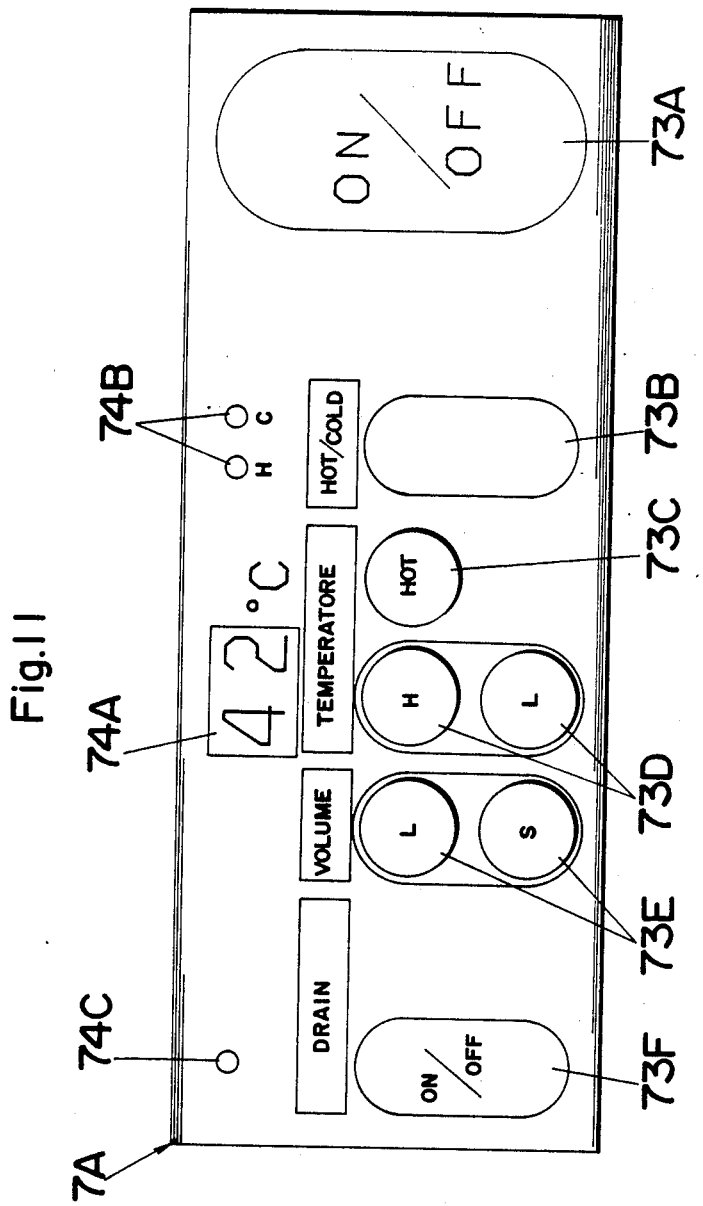
FIGS. 11 to 13 are front view of control panels of terminal controllers to be provided respectively for bathtub, basin, and shower.

FIG. 11 shows a front panel of the terminal controller 7C for the bathtub. As seen in the figure, the operational switch 73 includes an ON/OFF switch 73A to start and stop supplying the water through the bathtub faucet 3A, a selection switch 73B to selectively supply the hot water at an intended temperature or the cold water substantially directly from the cold water source, a switch 73c to supply the hot water substantially directly from the hot water source, a temperature set switch 73D to select the temperature of the water in an ascending and descending manners by the use of H- and L-marked buttons, a flow volume set switch 73E to select a flow volume per unit time in an increasing and decreasing manner by the use of L- and S-marked buttons, and a drain switch 73F to open and close the drain valve 47. The display 74 is also shown to comprises a LCD segment display 74A which normally shows the selected temperature and turns to show particular error codes upon occurrence of system failures, LEDs 74B for indication of the operation of the switch 73B, and a LED 74c for indication of the condition of the drain valve 47.

Figure 12:
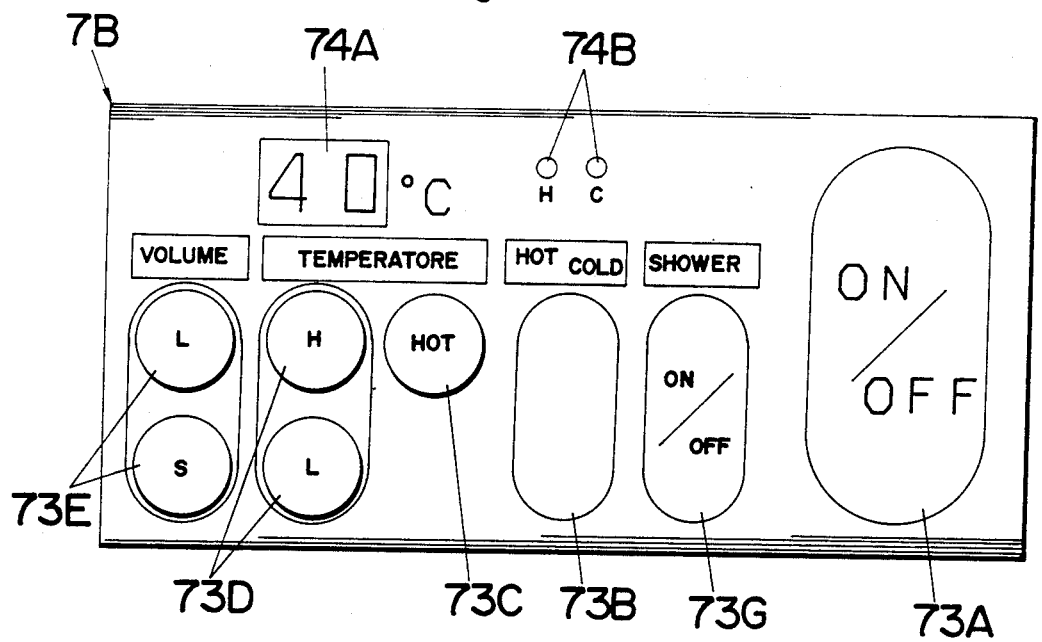

FIG. 12 shows a front panel of the terminal controller 7B for the basic faucet 3B, which is basically identical in structure and operation to that of the terminal controller 7A except that the drain switch and the associated LED are removed and that a shower control switch 73G is added to control the shower faucet 3C also at the controller 7B.

Figure 13:
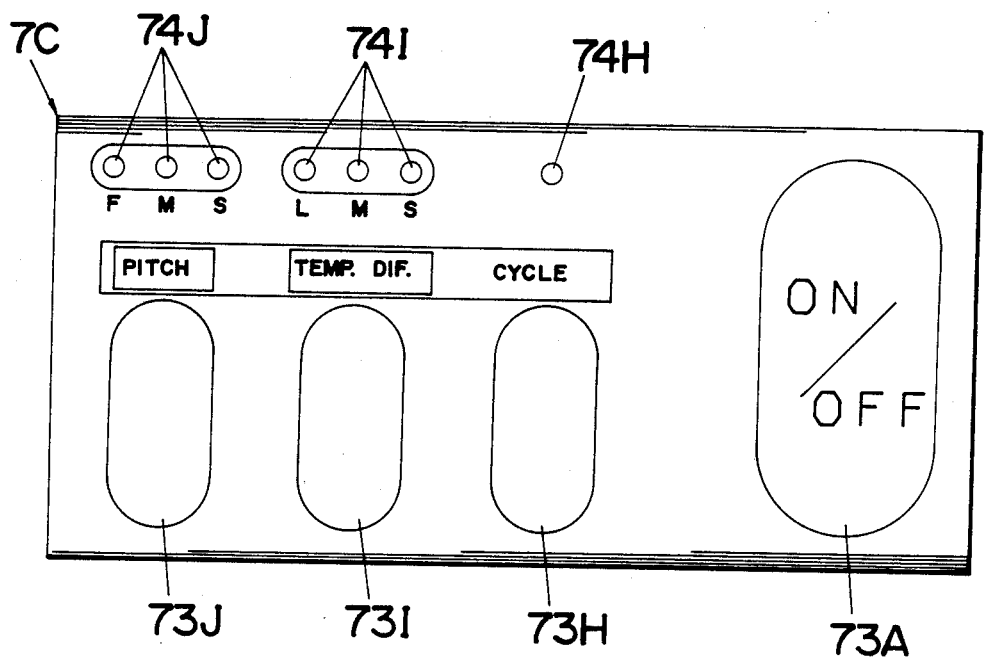

FIG. 13 shows a front panel of the terminal controller 7C for the shower faucet 3C. The switch 73 of the controller 7C is shown to comprise, in addition to an ON/OFF switch 73A to start and stop supplying the water, a cycle switch 73H to select a cyclic operation of discharging the water of which temperature varies cyclically, a temperature difference set switch 73I for selecting within three preset values the temperature difference within which the water temperature varies in the above cyclic operation, and a pitch selection switch 73J for varying a pitch or a cycle of the above cyclic operation. The display 74 is also shown to comprise a LED 74H which turns on when the cyclic operation is selected, LEDs 74I for indication of the temperature differences (Large, Medium, and Small) selected by the switch 73I, and LEDs 74J for indication of the pitch (Fast, Medium, and Slow) selected by the switch 73J.

Figure 14:
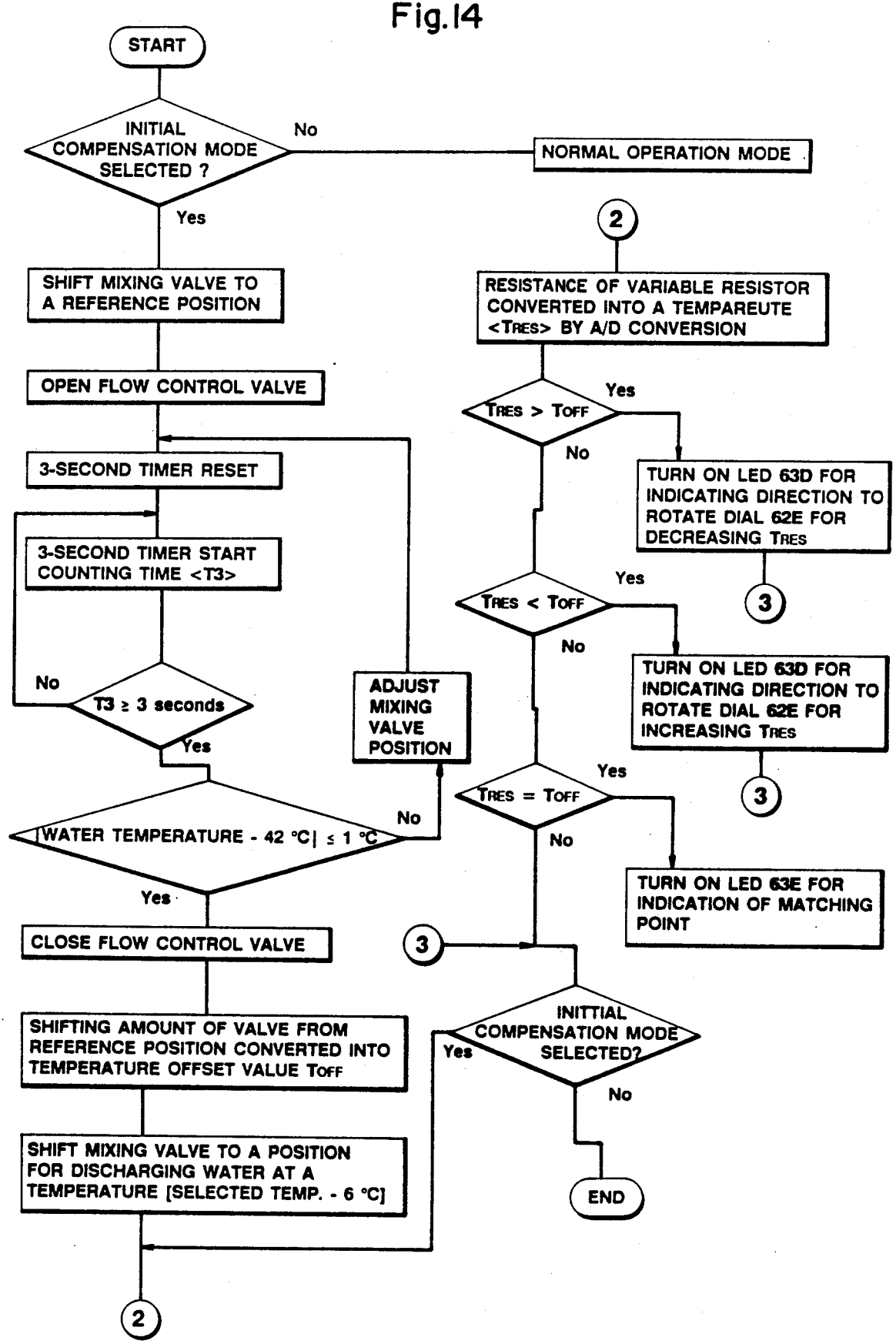
FIG. 14 is a flow chart illustrating an initial compensation mode of the system.

In operation, when the system is firstly installed, the system is made into the initial compensation mode by the switch 6IH at the master controller 60 to effect the above initialization by manipulating the correction dial 62E with the aid of the direction indicating and match point indicating LEDs 63D and 63E for adjusting the system to the conditions of the particular installation site based upon the offset value compensating for the variations in temperature and pressure of the hot and cold water sources available at the installation site. Once the initialization is completed, the offset value is stored permanently as a specific resistive value in the variable resistor such that the system can effect a consistent temperature control in the normal operation mode based upon the offset value and requires no further initialization unless the conditions of the installation site are substantially changed. As shown in the flow chart of FIG. 14, the initialization sequence begins by manipulating the mode switch 61H into the initial compensation mode to drive the mixing valve 15 to move into the reference position and open the flow control valve 41. Then, a 3-second timer is reset and start counting so as to examine whether the deviation between the temperature of the water being discharged and the reference temperature, for example, 42° C. corresponding to the reference position of the valve 15 is less or greater than 1° C. after the elapse of 3 seconds. When the deviation is found to be greater than 1° C., the sequence goes to a step for shifting the position of the valve 15 until the resulting temperature deviation becomes within 1° C. after 3 minutes elapse of time. Thereafter, the flow control valve 41 is closed and the shifting amount of the mixing valve 15 from the reference position is converted into a corresponding temperature offset value Toff. At the same time, the mixing valve 15 is driven to move to a position ready for discharging the water at a shower temperature which is lower by 6° C. than the reference temperature (42° C.). Next step is to reassociate the temperature scale at the controller with the water temperature by manipulating the correction dial 62E to adjust the resistance of the variable resistor. For this purpose, the resistance of the variable resistor is converted by analog-digital conversion into corresponding discrete temperature values Tres and is acknowledged by CPU 60 of the master controller 6. The temperature value Tres is then compared at CPU 60 with the temperature offset value Toff. When Tres is greater than Toff, LED 63D is turned on to indicate the direction in which the dial 62E is required to rotate for equalizing the values Tres and Toff. On the other hand, when Tres is smaller than Toff, the other LED 63D is turned on to indicate the opposite direction for rotating the dial 62E to equalize the values. When these values Tres and Toff are matched, LED 63E is turned on to notify the user that the initialization is completed and no further adjustment of the dial 62E is required. Upon completion of the above initialization sequence, the temperature offset value Toff thus determined is stored in the variable resistor such that the control circuit 50 compensates for the variations at the installation site based upon the offset value Toff to insure consistent temperature control.

In the normal operation mode, the settings at each of the terminal controller 7A, 7B, and 7C by individual switches are transmitted to the control circuit 50 to override the default settings at the master controller 6 for effecting desired controls of the temperature and the flow rate of the water being discharged. When the temperature setting is changed from the temperature determined at the master controller 6, the display 74 at the corresponding terminal controller responds to display the changed water temperature.

It is again noted at this time that at the very start of discharging the water, the mixing valve 15 acts to self-adjust its position in response to the temperature of the water being discharged so as to be responsible for automatic temperature control in the open loop control rather than the feed back control using the temperature sensor 25, preventing an accidental discharge of the water at a temperature higher than expected. When the system goes into a steady state of constantly discharging the water, the feed back control takes over to give versatile and delicate temperature controls as discussed hereinbefore and will be discussed hereinafter.

Figure 17A:
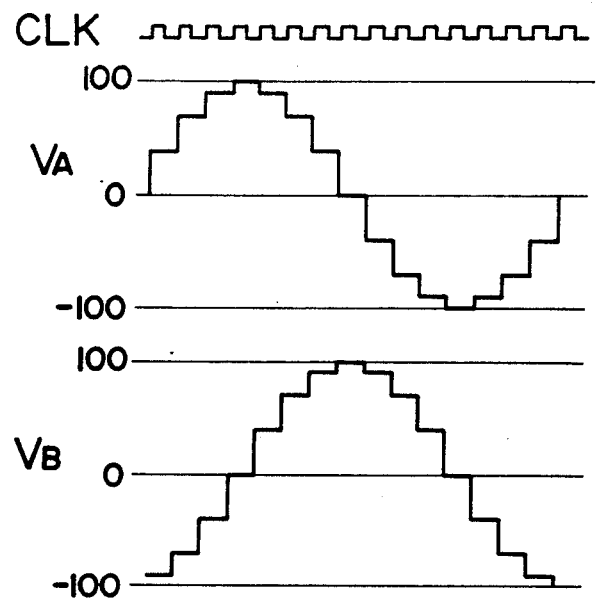
FIGS. 17A and 17B are waveform charts respectively illustrating differing modes of excitation for driving the motor.
Figure 17B:
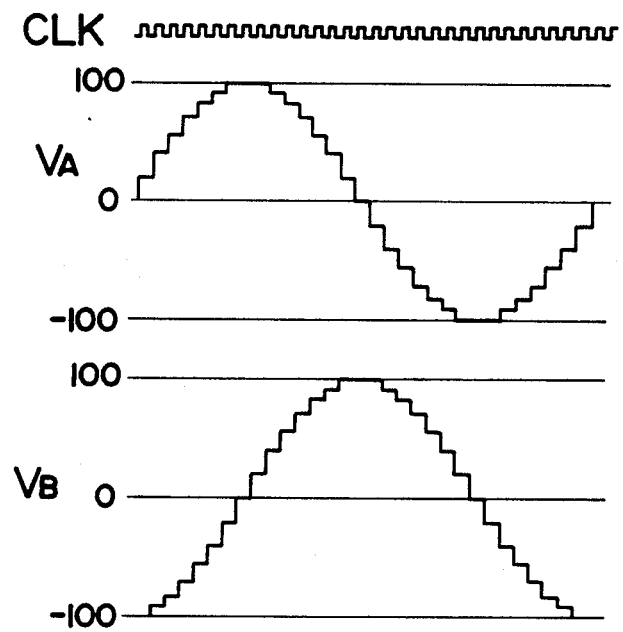
Figure 18:
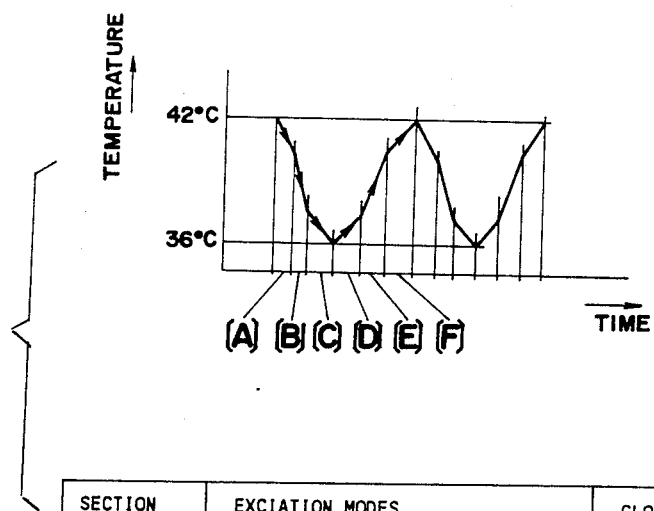
FIG. 18 are graphic representation of the water temperature with respect to an elapse of time seen in an cyclic temperature control operation with varying modes of excitation of the motor.

For control of the stepping motor 31 which drives the mixing valve 15 to vary its position in accordance with the instruction from the control circuit 50, the motor driver 53 is configured by a driver IC (TA8524H available from Toshiba corp.) which is capable of selecting different excitation modes for driving the motor at the same clock rate. Thus, the motor speed is suitably controlled by changing the excitation modes depending upon desired temperature control operations. FIGS. 17A and 17B illustrate one example for effecting the cyclic operation in which the excitation modes are changed for supplying the water of which temperature varies cyclically for example, at a cycle of 10 seconds, as shown in FIG. 18. In the figures, CLK is for a clock signal, VA for A-phase drive signal, VB for B-phase drive signal, and (a) to (f) are respectively time sections at which the excitation modes are changed at the same clock rate between full-step (4-division micro-step) drive and half-step (8-division micro-step) drive in accordance with the schedule shown in the table of FIG. 18 for obtaining the illustrated temperature-time curve. The above speed control of the stepping motor 31 by changing the excitation modes with a fixed clock rate is advantageous in that the stepping motor 31 is free from resonance point or follow-up limit which would be possible when driving the motor by changing the clock rate and would the cause of motor speed control failure.

As discussed previously, the stepping motor 31 is arranged to change its speed depending upon the difference between a previously selected water temperature and a target water temperature to be intended. That is, when it is intended to change the previous selected water temperature to a slight extent, the motor 31 is rotated by half-step (8-division micro-step) drive to shift the valve 15 and therefore the temperature at such a rate slow (for example, 2° C./second) enough to prevent over- and under-shooting. On the other hand, when it is intended to change the previous selected water temperature to a greater extent, the motor 31 is rotated by full-step (4-division micro-step) drive to shift the valve 15 and the temperature at such a rapid rate (for example, 4° C./second) for rapid temperature adjustment. By better utilization of such rapid temperature adjustment, it is possible to select a wide temperature range within which the water temperature varies cyclically when operating the system in the above cyclic operation for a showering purpose.

Also, the motor 31 is driven to return the valve 15 back to the reference position by monitoring the reference signal from the position sensor 27 each time the system stops supplying the water such that the valve 15 can be returned back exactly to the reference position even when there are noise or other causes which would cause the motor 31 to rotate to an excess or less extent than intended. Therefore, the next temperature control can be made by shifting the valve 15 from the exact reference position, contributing to increasing reliability of temperature control. The reference position of the valve 15 is defined as corresponding to a mid point (i.e. 42° C.) within the temperature range (38° to 45° C.). The mid temperature point is expected to be set most frequently in the actual use, such that the shifting amount of the valve 15 can be maintained at a minimum to reduce the time required for the intended temperature control. For checking the above operation of returning the valve 15 to the reference position, the system monitors the position signal from the position sensor 27 within a limited time (for example, 5 seconds) from the start of driving the valve 15 toward the reference position, and issue a warning signal when the position signal is not received within the limited time interval. Upon such occurrence, the system goes into a abnormal condition detecting mode to seek the cause.

Figure 15:
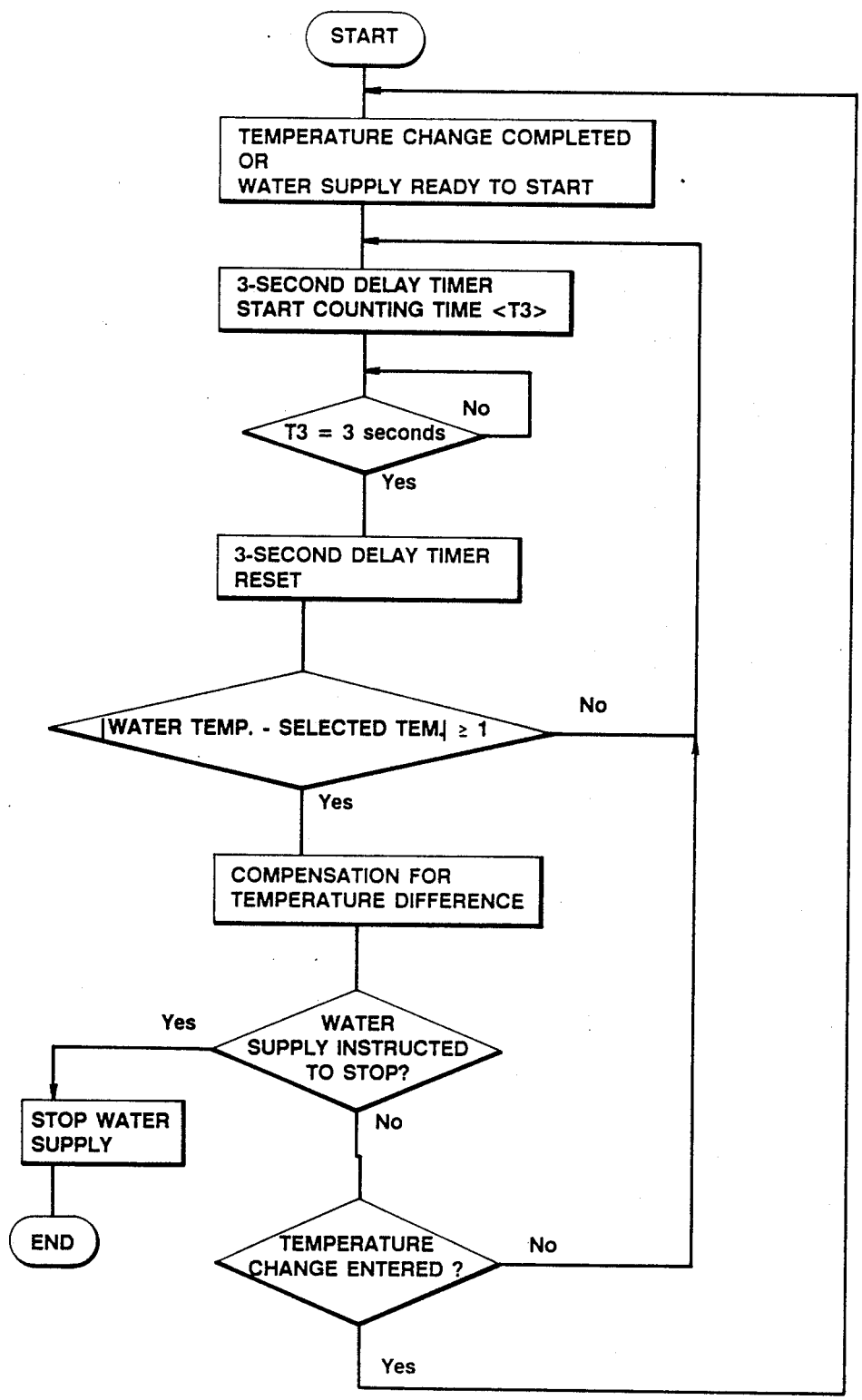
FIGS. 15 and 16 are flow charts respectively illustrating temperature control operations of the system in a normal operation modes.

In the steady water supplying state, the system monitors the water temperature by the sensor 25 in order to control the temperature in the feed back manner based upon the monitored temperature, as shown in FIG. 15. When the temperature change is entered or the water supplying is ready to begin, a 3-second delay timer starts counting a time and is reset at every 3-second elapse of time so as to compare the temperature of the water being discharged after 3-second elapse of time from the start of discharging with the selected temperature. When the difference between the temperatures is less than 1° C., the sequence goes back to re-start the delay timer. When, on the other hand, the temperature difference is not less than 1° C., the system compensate for the temperature difference by shifting the position of the valve 15. Such operations repeat unless the system is instructed to stop supplying the water so that the water temperature is automatically controlled over the entire time period of the water supplying. Since the temperature compensation by the feed back control is made in such delayed manner by the use of the delay timer, the system can be substantially free from a hunting of the temperature even if the mixing valve 15 is self-adjusted its position in response the temperature of the water to cause over- and under-shooting temperature control. This is particularly important in preventing the discharging of the water of which temperature is unexpectedly higher than intended and therefore preventing the scalding.

Figure 16:
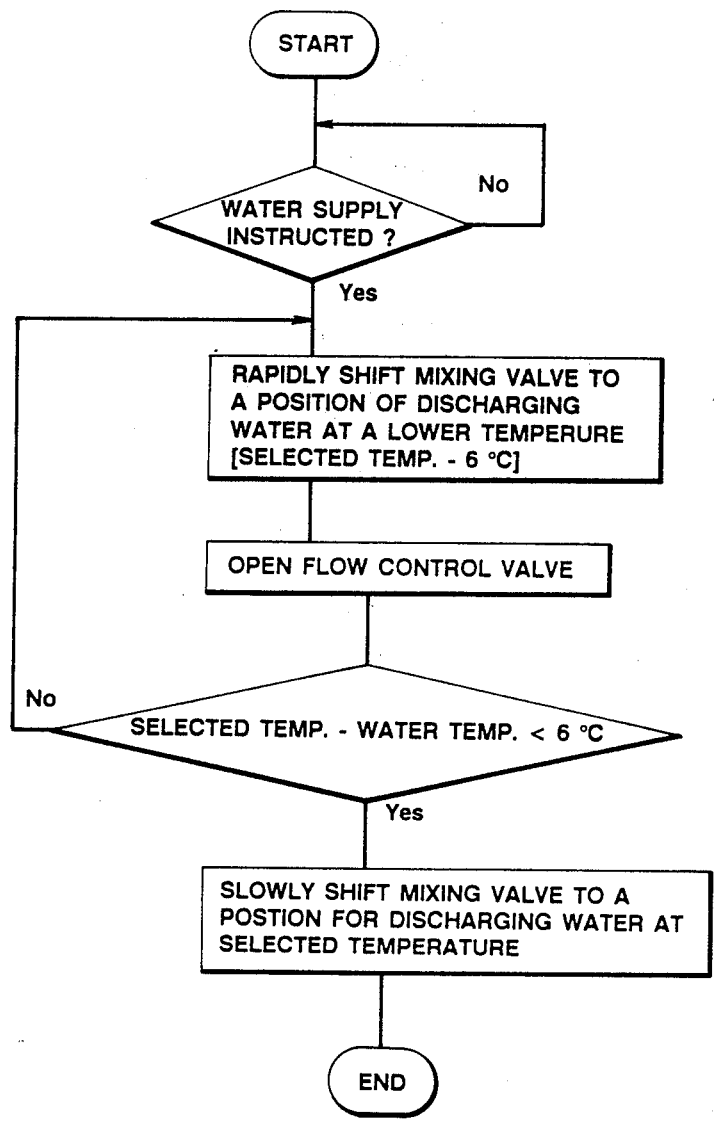
Figure 19:
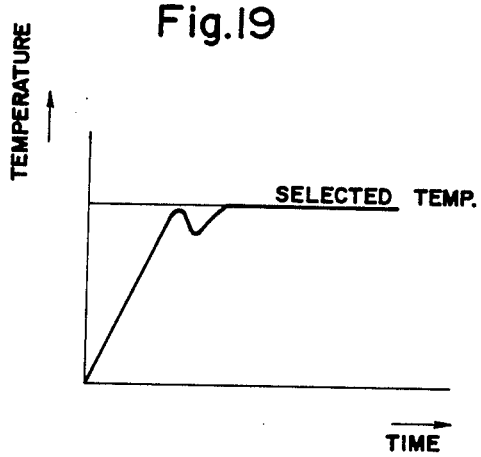
FIG. 19 is a graphic representation of a temperature-time curve obtained by the present system.

Further, as shown in the flow chart of FIG. 16, at each start of supplying the water, the system operates to move the mixing valve 15 at a higher rate from the reference position to a position of discharging the water at the shower temperature lower by 6° C. than the temperature selected at the controller. This is made preferably within a limited time interval from the start of supplying the water where a possible overshooting may be expected, whereby effecting moderate temperature control of the water as shown in FIG. 19, and therefore effectively preventing the discharge of the water at an unexpectedly high temperature. Thus, the user can enjoy comfortable bathing or showering.

What is claimed is:

1. A hot water supplying system comprising:
   hot and cold water inlets adapted to be coupled respectively to hot and cold water sources;
   an outlet;
   a mixing chamber in fluid communication with said hot and cold inlets as well as said discharge outlet;
   a mixing valve operatively connected to an electric motor to be thereby movable within said mixing chamber so as to vary the mixing ratio of the volume of the hot water to the cold water being fed from said hot and cold water inlets for discharging the water through said outlet,
   controller means having input means to select a temperature of the water intended to be discharged from said mixing chamber through said outlet, said controller means controlling said motor, in accordance with a predetermined relation between a temperature scale determined in said controller means and the position of said mixing valve in said mixing chamber, to move said mixing valve into a suitable position in order to discharge the water at said temperature selected at said input means;
   said mixing valve comprising a temperature-responsive actuator which adjusts the position of the mixing valve independently of the control of said controller means in response to the temperature of the water being discharged through said outlet for self-adjustment of the water temperature to said selected temperature;
   said system further including an initial compensation means which comprises:
   temperature sensor means for sensing the temperature of the water being discharged from said mixing chamber;
   positioning means for driving said motor to move said mixing chamber to a reference position;
   deviation detecting means which detects a deviation between the temperature of the water being discharged with said mixing valve at said reference position and the temperature designated at said controller means as corresponding to said reference position of said mixing valve;
   offset means for determining and storing an offset value which corresponds to the shifting amount of said mixing valve required to maintain said deviation within an acceptable level;
   compensation means for reestablishing, based upon said offset value, the relation between said temperature scale at said controller means and the position of said mixing valve within said mixing chamber in order to exactly associate the temperature to be selected at said controller means with the position of said mixing valve for discharging the water at a temperature as close as possible to the temperature to be selected at said controller means.

2. A hot water supplying system as set forth in claim 1, wherein said offset means comprises a variable resistor with a handle capable of determining and storing said offset value, said offset means further including guide indicator means positioned adjacent said handle, said guide indicator means indicating the manipulating direction of said handle for varying said offset value in the direction of reducing said deviation to said acceptable level.

3. A hot water supplying system as set forth in claim 1, further including mode selection switch means to selectively operate said system in a normal operation mode for controlling the position of said mixing valve to effect the temperature control of the water being discharged and in an initial compensation mode for determining said offset value and reestablishing said relation between the temperature scale at said controller means and the position of said mixing valve.

4. A hot water supplying system as set forth in claim 1, wherein said controller means includes a driver circuit for driving said motor to thereby shift the position of said mixing valve, said driver circuit operating to move faster said motor when the temperature of the water being discharged is far from the temperature selected at said controller means than when the water temperature is close to said selected temperature.

5. A hot water supplying system as set forth in claim 4, wherein said motor is a stepping motor of which rotating speed is varied by changing excitation modes thereof.

6. A hot water supplying system as set forth in claim 5, wherein said system further comprises:
   position sensor means which provides a reference signal when said mixing valve is at said reference position;
   drive means which, in response to the completion of discharging the water from said mixing chamber, drives said motor to move said mixing valve until said position sensor means provides said reference signal to thereby move said mixing valve back to said reference position such that the temperature control of the water to be subsequently discharged is effected by shifting said mixing valve from said reference position.

7. A hot water supplying system as set forth in claim 6, wherein said reference position is determined as a position of said mixing valve which corresponds substantially to a midpoint of the temperature range to be selected at said controller means.

8. A hot water supplying system as set forth in claim 1, further including delayed temperature control means which, upon detection of that the difference between the temperature of the water being discharged and the temperature selected at said controller means is greater than a predetermined reference, controls said mixing valve to move in the direction of reducing said temperature difference in a delayed fashion.

9. A hot water supplying system as set forth in claim 1, further including a moderate means to retain the water being discharged at a temperature lower than the temperature selected at said controller within a limited time period from the start of discharging the water.

* * * * *